3,316,204
PIGMENTED FORMALDEHYDE-BASED THERMO-
SETTING RESIN COMPOSITIONS
Gerald Lederer, Hartburn, Stockton-on-Tees, England, assignor to British Titan Products Company Limited, Billingham, England, a company incorporated of Great Britain
No Drawing. Filed July 13, 1962, Ser. No. 209,786
Claims priority, application Great Britain, July 27, 1961, 27,310/61
11 Claims. (Cl. 260—38)

The present invention relates to pigment of improved resistance to deterioration when exposed to ultraviolet light such as sunlight. Such pigment is particularly useful as it remains resistant to deterioration even after incorporation into a resin in whose manufacture is used a reducing agent. The use of such pigment in other media is also contemplated. For example, the pigment may be used in paint compositions.

Finely divided titanium dioxide, preferably in the rutile form, is widely used as a pigment for incorporation into resins, for example in the formation of paper laminates or the formation of moulded pigmented articles.

When used for this purpose titanium dioxide pigments have been found to deteriorate relatively rapidly in respect to colour, even when the pigments are coated with various materials, for example silica or titanium dioxide. Such deterioration occurs particularly rapidly when the pigment is incorporated into synthetic resinous material in whose manufacture are used reducing agents, for example formaldehyde, and the pigmented resin is exposed to light in the ultraviolet range.

It is an object of the present invention to provide pigments having an increased resistance to such deterioration. It is also an object of the invention to provide a process for the production of such pigments.

Accordingly, the present invention provides pigmentary titanium dioxide, preferably in the rutile form, coated with stannic oxide and alumina.

The invention also provides a process for production of such pigments comprising coating pigmentary titanium dioxide with stannic oxide and alumina.

The pigment can be mixed with a thermosetting resin in whose manufacture is used a reducing agent, for example formaldehyde as in a urea-formaldehyde or melamine-formaldehyde or phenol-formaldehyde resin, and the resulting mixture subjected to elevated temperature and pressure to cure the resin. In such a process the pigment may first be incorporated into a supporting material, for example paper or glass fibre, before impregnation of this material with the resin.

While rutile pigment coated with stannic oxide and alumina has improved resistance to deterioration, when compared with uncoated pigment, even better results can be obtained if the coated pigment is heated at a temperature of at least 625° C. This resistance to discoloration under the conditions described can be still further enhanced by the application of other coatings in addition to stannic oxide and alumina, and, in particular, a coating of silica, before heating. Titanium dioxide pigment in the rutile form which has been coated with alumina, silica and stannic oxide, and which has thereafter been heated at a temperature of at least 625° C., has outstandingly good resistance to discoloration in the presence of resins, in whose manufacture a reducing agent has been used, when the pigment is exposed to light having a wave length in the ultraviolet range; such pigment is therefore the most preferred product of the present invention.

The amount of stannic oxide applied as a coating may vary, but should generally be at least 0.1%, and preferably 0.2% to 2%, of the weight of the final pigment.

The amount of alumina applied as a coating may vary, but should generally be 0.5–7%. If no silica coating is being applied, the amount of alumina is preferably 1.5–2%. If a silica coating is being applied, the amount of alumina is preferably 3–5%, and the amount of silica may suitably be 0.05–5%, preferably 1.5–2.5%, by weight of the final pigment.

The application of the coatings may be carried out by any suitable method. One convenient method is to form an aqueous dispersion of titanium dioxide pigment (normally using a dispersing agent such as sodium silicate or sodium hexametaphosphate) and to add to this the desired amount of an aluminum salt, for example the sulphate, and an aqueous solution of stannic chloride or stannous chloride in an oxidising acid, for example concentrated nitric acid. (Stannous oxide may also be used in a non-oxidising acid, for example hydrochloric acid.) The resulting mixture is then neutralised by the addition of alkali, for example sodium carbonate, to a pH value in the range of 7 to 8. The mixture is then allowed to stand before separating off and drying the solids. If a coating of silica is to be applied, an aqueous solution of sodium silicate may be added before the neutralisation is effected.

If desired, the titanium dioxide particles to be coated may contain a small proportion of materials other than titanium dioxide, for example other inorganic oxides (e.g., zinc or antimony oxide) and/or inorganic salts (e.g., sodium or potassium sulphate, phosphate or borate). Small quantities of alumina and silica may be produced simultaneously with the titanium dioxide particles so as to be incorporated in the latter. This is known practice which is to be clearly distinguished from the coatings of the present invention.

If the coated pigment is to be heated it should generally be subjected to a temperature of at least 625° C. but it is preferred to heat the particles to a higher temperature, for example in the range 700 to 800° C. or even higher. The use of temperature substantially above 800° C. however, tends to result in excessively large particles, which have a reduced tinting strength and brightness and such temperatures should preferably not be maintained for any length of time for example not more than a few minutes. At temperatures above 900° C. there is a danger of discoloration of pigment and heating at these temperatures should be very carefully controlled.

Heating periods of at least 15 minutes, such as from 30 minutes to 100 minutes, are often found suitable. However, shorter heating periods may be found to give entirely adequate results; this is particularly likely to be the case if the heating is effected by spray drying a slurry of the coated pigment, and the heating period may then be very short.

When not treated by the present process, titanium dioxide pigments, when incorporated into resins containing a reducing agent, tend to darken when exposed to ultraviolet light. It is believed that this darkening is due to the reduction of titanium dioxide to a lower valency state by the reducing agent in the resin.

In the formation of resin-bonded paper products, the pigments, when treated according to the present invention, may be incorporated into the paper at the final beating stage when lignin and cellulose fibres are being beaten by an agitator in aqueous suspension.

One or more sheets of the resulting paper containing the treated pigment (such sheets having a suitable design printed on them, if desired) can then be impregnated with a thermosetting resin containing a reducing agent, for example a urea-formaldehyde or melamine-formaldehyde resin, and the sheet or sheets of paper thus produced can be subjected to elevated temperature and pressure to cure the resin. Such an elevated temperature is commonly in the range of 120° C. to 150° C., for example about 135° C. The elevated pressure is commonly within the range of 2,000 to 2,700 lbs./sq. inch, for example about 2,500 lbs./sq. inch.

Where a number of sheets of paper are so treated a paper laminate may result. Alternatively, a single sheet may be bonded to another surface, for example a wood or hardboard surface, to provide a decorative finish to this material.

The following example illustrates the process of the present invention.

*Example*

Batches of pigmentary titanium dioxide of the rutile form were coated as described below.

(1) Rutile titanium dioxide pigment was dispersed in water and an aqueous solution of 5% aluminum sulphate was added in sufficient amount to provide 2% by weight of aluminum oxide. A 5% solution of stannous chloride in concentrated nitric acid (70% nitric acid in water) was then added in sufficient amount to provide 0.5% by weight of stannic oxide based on the weight of the final pigment.

A 12% solution of sodium carbonate was then added until the mixture had a pH value of 7.4.

The mixture was allowed to stand for 30 minutes and the solids were filtered off and dried at 110° C.

(2) The process described in (1) above was repeated and the product was heated for 1 hour at a temperature of 625° C.

(3) The process described in (1) above was repeated but sufficient aqueous aluminum sulphate was added to provide 4% by weight of aluminum oxide, and after the addition of stannous chloride and before neutralisation an aqueous solution of sodium silicate was added in sufficient amount to provide 2.0% by weight of silicon dioxide.

(4) The process described in (3) above was repeated and the product was heated at 625° C. for one hour.

The pigments produced as described in (1)–(4) above were each incorporated into a laminated board as described below.

Six core papers of brown unpigmented kraft paper, each about 11-thousandths of an inch thick were impregnated with a cheap phenolic resin. Two white papers containing the treated pigment, each paper being about 3.5-thousandths of an inch thick, were then impregnated with an aqueous solution of a melamine-formaldehyde resin, containing 43% of the resin. The white papers were then dried in air and placed on the core papers and the whole was compressed at a temperature of 135° C. and at a pressure of 2,500 lbs./sq. inch for 15 minutes.

A similar laminated board was formed from uncoated rutile pigmentary titanium dioxide.

The laminated boards thus formed were exposed for 64 hours to a 500 watt medium pressure mercury vapour lamp placed at a distance of 14 inches from the board. The light from this lamp was filtered through a ⅛ of an inch thick sheet of window glass to remove ultraviolet radiation of the shorter wave lengths, thus giving a light having a spectrum approximating to that of sunlight.

The boards, after treatment, were compared with a set of standard discoloured strips prepared by exposing photographic plate to light for varying lengths of time. These strips were rated on a scale from 0 to 10 in which 0 represented no discoloration and 10 represented marked discoloration.

The results obtained were as follows.

| Laminated board containing: | Rating |
|---|---|
| Pigment (1) | 3 |
| Pigment (2) | 1 |
| Pigment (3) | 3 |
| Pigment (4) | 0.5 |
| Uncoated pigment | 8 |

What is claimed is:

1. Pigmented resin composition comprising a formaldehyde-based thermosetting resin having incorporated therein pigmentary titanium dioxide particles; said particles having a surface coating consisting of a mixture of from about 0.1 to about 2.0 percent by weight stannic oxide, about 0.5 to about 7.0 percent by weight aluminum oxide and up to about 5 percent by weight silica based on the weight of the coated pigment; said pigmented composition being resistant to discoloration when exposed to ultraviolet radiation.

2. Composition as defined in claim 1 wherein said thermosetting resin is selected from the group consisting of urea-formaldehyde, melamine-formaldehyde and phenol-formaldehyde resins.

3. Composition as defined in claim 1 wherein said surface coated titanium dioxide particles are calcined at a temperature of from about 625° centigrade to about 800° centigrade.

4. Composition as defined in claim 2 wherein said surface coating mixture contains from about 0.2 to about 2.0 percent by weight stannic oxide and from about 1.5 to about 2.0 percent by weight aluminum oxide and wherein said surface coated titanium dioxide particles are calcined at a temperature in the range of from about 625° centigrade to about 800° centigrade 5. Composition as defined in claim 1 wherein said surface coating mixture contains from about 0.05 to about 5.0 percent by weight of silica.

6. Composition as defined in claim 2 wherein said surface coating mixture contains from about 1.5 to about 2.5 percent by weight silica, from about 3.0 to about 5.0 percent by weight aluminum oxide and from about 0.2 to about 2.0 percent by weight stannic oxide and wherein said surface coated titanium dioxide particles are calcined at a temperature in the range of from about 625° centigrade to about 800° centigrade.

7. Process for preparing pigmented formaldehyde-based thermosetting resins resistant to discoloration when exposed to ultraviolet radiation, comprising admixing the resin raw materials with pigmentary titanium dioxide particles having a surface coating consisting of a mixture of from about 0.1 to about 2.0 percent by weight stannic oxide, about 0.5 to about 7.0 percent by weight aluminum oxide and up to about 5 percent by weight silica based on the weight of the coated pigment, and then heating the admixture to cure the resin 8. Process of claim 7 wherein said thermosetting resin is selected from the group consisting of urea-formaldehyde, melamine-formaldehyde and phenol-formaldehyde resins.

9. Process of claim 7 wherein said surface coated titanium dioxide particles are calcined at a temperature of from about 625° centigrade to about 800° centigrade.

10. Process of claim 8 wherein said coating mixture contains from about 0.2 to about 2.0 percent by weight stannic oxide and from about 1.5 to about 2.0 percent by weight aluminum oxide and wherein said surface coated titanium dioxide particles are calcined at a temperature in the range of from about 625° centigrade to about 800° centigrade.

11. Process of claim 8 wherein said coating mixture contains from about 1.5 to about 2.5 percent by weight silica, from about 3.0 to about 5.0 percent by weight aluminum oxide and from about 0.2 to about 2.0 percent by weight stannic oxide and wherein said surface coated titanium dioxide particles are calcined at a temperature in the range of from about 625° centigrade to about 800° centigrade

References Cited by the Examiner

UNITED STATES PATENTS

| | | |
|---|---|---|
| 2,297,523 | 9/1942 | Allan et al. |
| 2,387,534 | 10/1945 | Seidel. |
| 2,559,638 | 7/1951 | Krchma _____ 106—300 |
| 2,671,031 | 3/1954 | Whately _____ 106—300 |
| 3,025,179 | 3/1962 | Holbein. |
| 3,035,966 | 5/1962 | Siuta _____ 162—181 |
| 3,087,828 | 4/1963 | Linton _____ 106—300 |
| 3,203,818 | 8/1965 | Reichman et al. ___ 106—300 |

MORRIS LIEBMAN, *Primary Examiner.*

MORRIS WOLK, *Examiner.*

S. L. BASHORE, A. LIEBERMAN, *Assistant Examiners.*